United States Patent
Widdig et al.

[11] 3,853,908
[45] Dec. 10, 1974

[54] 1-AMINO-SULFONYL-2-AMINOBENZIMIDAZOLES

[75] Inventors: Arno Widdig, Blecher; Engelbert Kühle, Bergisch-Gladbach; Ferdinand Grewe, Burscheid; Helmut Kaspers, Leverkusen, all of Germany

[73] Assignee: Bayer Aktiengesellschaft, Leverkusen, Germany

[22] Filed: Feb. 2, 1973

[21] Appl. No.: 328,998

[30] Foreign Application Priority Data
Feb. 9, 1972  Germany............................ 2206010

[52] U.S. Cl..... 260/309.2, 260/247.1 L, 260/293.6, 424/248, 424/267, 424/273
[51] Int. Cl............................................. C07d 49/38
[58] Field of Search....................... 260/309.2, 293.6

[56] References Cited
OTHER PUBLICATIONS
Bywater Chem. Abst. Vol. 40, column 1595 (1946). QD1.A51.
Cohen et al. J. Amer. Chem. Soc. Vol. 84, pages 1994, 1995 & 2000 relied on (1962). QD1.A5.
Mandel et al. J. Med. Chem. Vol. 13, pages 1043–1047 (1970). RS1.J5.
Weidenhagen et al. Chem. Abst. Vol. 31, columns 3914–3915 (1937). QD1.A51.

*Primary Examiner*—Natalie Trousof
*Attorney, Agent, or Firm*—Burgess, Dinklage & Sprung

[57] ABSTRACT

1-amino-sulfonyl-2-aminobenzimidazoles of the formula

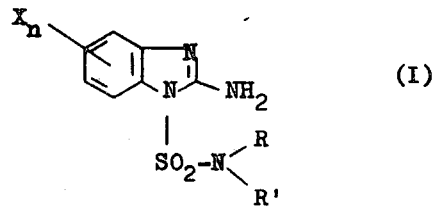

in which
X is halogen, lower alkyl or lower alkoxy,
n is 0, 1 or 2,
R and R' each independently is alkyl with 1 to 6 carbon atoms optionally substituted by at least one of halogen, cyano and lower alkoxy, or
R and R', together with the connecting nitrogen atom, is a heterocyclic ring with 4 to 7 carbon atoms, which possess fungicidal properties.

7 Claims, No Drawings

1-AMINO-SULFONYL-2-AMINOBENZIMIDAZOLES

The present invention relates to and has for its objects the provision of particular new 1-amino-sulfonyl-2-aminobenzimidazoles, i.e., 1-(N,N-disubstituted)-2-amino-(optionally mono- or di-substituted)-benzimidazoles, which possess fungicidal properties, active compositions in the form of mixtures of such compounds with solid and liquid dispersible carrier vehicles and methods for producing such compounds and for using such compounds in a new way especially for combating pests, e.g., fungi, with other and further objects becoming apparent from a study of the within specification and accompanying examples.

It is known from U.S. Pat. No. 2,457,674 that salts of dithiocarbamic acid, for example zinc ethylene-1,2-bis-dithiocarbamate (Compound A) can be used for the control of plant diseases caused by Phycomycetes. These preparations, because of their high protective activity, have attained a great importance in practice but they exhibit no curative or even systemic activity.

It is further known from U.S. Pat. No. 3,541,243 that various benzimidazoles exhibit very good curative and systemic properties in the case of a series of fungal diseases of cultivated plants, for example 1-butylcarbamidylbenzimidazole-2-carbamic acid methyl ester. These benzimidazoles, however, do not have an activity against the mycoses caused by Phycomycetes (cf. Plant Disease Reptr. (1968) 52, 95–99).

The present invention provides 1-aminosulfonyl-2-amino-benzimidazoles of the general formula

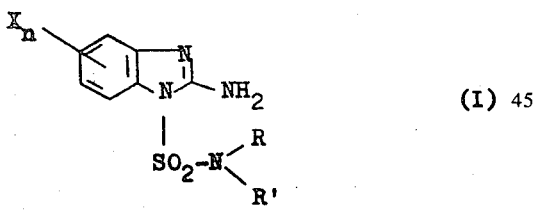

(I)

in which
X is halogen, lower alkyl or lower alkoxy,
n is 0, 1 or 2,
R and R' each independently is alkyl with 1 to 6 carbon atoms optionally substituted by at least one of halogen, cyano and lower alkoxy, or
R and R', together with the connecting nitrogen atom, is a heterocyclic ring with 4 to 7 carbon atoms.

Preferably X is chlorine, bromine, fluorine, or alkyl or alkoxy of up to four carbon atoms, e.g. methyl, ethyl, isopropyl, n-butyl, methoxy, or isopropoxy; n is 0 or 1; R and R' each independently is optionally substituted lower alkyl, e.g., methyl, ethyl, n-propyl, methoxyethyl or chloroethyl, or R and R', together with the nitrogen atom, stand for pyrrolidino, piperidino or morpholino, or other oxygen or sulfur-containing heterocyclic ring.

It is very surprising that the 1-aminosulfonyl-2-aminobenzimidazoles according to the invention exhibit an improved fungicidal activity compared with the zinc ethylene-1,2-bis-dithiocarbamate mentioned above and show an activity against Phycomycetes fungi which the systemically fungicidal benzimidazoles lack. A good curative activity is likewise present.

The active compounds according to the invention therefore represent a valuable enrichment of the art.

The invention also provides a process for the production of a 1-aminosulfonyl-2-aminobenzimidazole of the formula (I) in which a 2-aminobenzimidazole of the formula

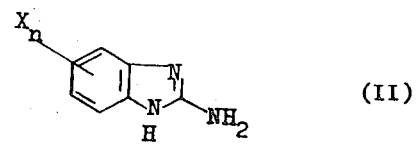

(II)

in which
X and n have the meanings stated above, is reacted with a sulfamic acid chloride of the general formula

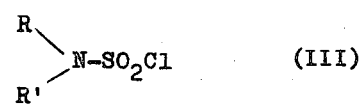

(III)

in which
R and R' have the meanings stated above, in the presence of an acid-binder and a diluent.

If 2-aminobenzimidazole and dimethylsulfamic acid chloride are used as starting materials, the reaction course can be represented by the following formula scheme:

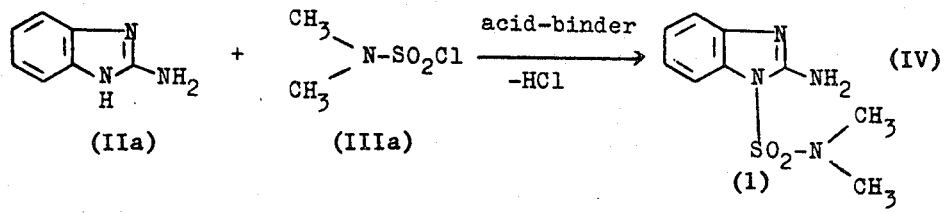

(IIa)   (IIIa)   (1)

As examples of 2-aminobenzimidazoles of formula (II) used as starting materials there may be mentioned:

2-aminobenzimidazole, 2-amino-5-chlorobenzimidazole, 2-amino-4-methyl-benzimidazole, 2-amino-5-methylbenzimidazole, 2-amino-5-n-butylbenzimidazole, 2-amino-5-methoxybenzimidazole.

The 2-amino-benzimidazoles are for the most part known (cf. Ann.chim.et phys. (8) 15, 189, 193 (1908); J. Amer. chem. Soc. 69, 2459 (1947); J. Med. Chem. 6, 601 (1963); Ann. Chim. (Rome) 53, 755 (1963)); they can moreover be prepared from o-phenylenediamines and cyanogen halide; as solvent, water can be used.

As examples of the sulfamic acid chlorides of formula (III) used as starting materials there may be mentioned: dimethylsulfamic acid chloride, diethylsulfamic acid chloride, di-n-propylsulfamic acid chloride, methylethylsulfamic acid chloride, piperidino-1-sulfochloride, morpholino-4-sulfochloride.

The sulfamic acid chlorides are for the most part known (cf. Bull. sec. chim. France (5), 3, 2143 (1936); J. Amer. chem. Soc. 61, 3250 (1939)). They can moreover be obtained from dialkylamines (or their salts) and sulfuryl chloride; benzene is a preferred solvent.

As diluent for the reaction according to the invention, one may use any inert organic solvent. Such solvents include for example hydrocarbons, such as benzine, ligroin, hexane, benzene or toluene; chlorinated hydrocarbons, such as methylene chloride, chloroform, carbon tetrachloride or chlorobenzene; ethers, such as diethyl ether, dibutyl ether, tetrahydrofuran or dioxane; ketones, such as acetone, methylisopropyl ketone, acetophenone or cyclohexanone; and any desired mixtures of such solvents.

As acid-binder for the reaction according to the invention there can be used, in principle, all inorganic and organic bases. Preferably, however, the representatives of this class which are readily accessible industrially are used. As examples, there may be mentioned sodium hydroxide, potassium hydroxide, sodium bicarbonate, potassium carbonate, sodium oxide, triethylamine, N,N-dimethylbenzylamine and pyridine.

The reaction temperatures can be varied within a fairly wide range. In general, the reaction is carried out at about 20° to 200°C, preferably about 50° to 150°C.

When carrying out the process according to the invention there are used, for each mole of 2-aminobenzimidazole, 1 mole of sulfamic acid chloride and 1 equivalent of acid-binder. The end products in some cases precipitate when the reaction mixture is cooled; some of them can be isolated by distilling off the solvent and separating the salt simultaneously formed. They can if necessary be purified by redissolving or recrystallization.

The active compounds according to the invention exhibit a strong fungitoxic activity and are distinguished by a broad activity spectrum. Their low toxicity to warm-blooded animals and their good toleration by higher plants permits their use as crop protection agents against fungal diseases. In the concentrations necessary for the control of the fungi they do not harm cultivated plants. Fungitoxic agents in crop protection are used for the control of fungi from the most diverse classes of fungi, such as Archimycetes, Phycomycetes, Ascomycetes, Basidiomycetes and Fungi Imperfecti.

The active compounds according to the invention can be used against parasitic fungi on above-the-soil parts of plants, fungi which cause tracheomycoses, which attack the plant from the soil, seed-borne fungi and soil-inhabiting fungi. They are particularly effective against causative organisms of plant diseases from the group of the Phycomycetes, for example *Phytophthora infestans*. As stated above, not only a protective, but also a curative and a systemic activity is present.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or insecticides, acaricides, rodenticides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–2 percent, preferably 0.0005 to 0.05 percent by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.0005–95 percent by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20to about 95 percent by weight of the active compound or even the 100 percent active substance alone, e.g., about 20–100 percent by weight of the active compound.

Furthermore, the present invention contemplates methods of selectively killing, combating or controlling pests, e.g., fungi, which comprises applying to at least one of correspondingly (a) such fungi, and (b) the corresponding habitat thereof, i.e., the locus to be protected, a correspondingly combative or toxic amount, i.e., a fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Phytophthora test

| | |
|---|---|
| Solvent: | 4.7 parts by weight acetone |
| Dispersing agent: | 0.3 part by weight alkylarylpolyglycol ether |
| Water: | 95 parts by weight |

The amount of the active compound required for the desired concentration of the active compound in the spray liquid was mixed with the stated amount of solvent and the concentrate was diluted with the stated amount of water which contained the stated additions.

Young tomato plants (Bonny best) with 2–6 foliage leaves were sprayed with the spray liquid until dripping wet. The plants remained in a greenhouse for 24 hours at 20°C and at a relative atmospheric humidity of 70 percent. The tomato plants were then inoculated with an aqueous spore suspension of *Phytophthora infestans*. The plants were brought into a moist chamber with an atmospheric humidity of 100 percent and a temperature of 18–20°C.

After 5 days the infection of the tomato plants was determined as a percentage of the untreated but likewise inoculated control plants: 0 percent means no infection; 100 percent means that the infection was exactly as great as in the case of the control plants.

The active compounds, the concentrations of the active compounds and the results can be seen from the following Table 1.

Table 1

Phytophthora test

| Active Compound | Infection as a percentage of the infection of the untreated control with a concentration of active compound (in % by weight) of 0.0062% | 0.0031% | 0.00156% |
|---|---|---|---|
| 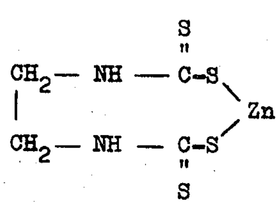  (known) (A) | 18 | 43 | 66 |
| 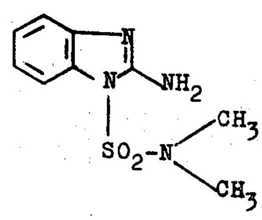  (1) | 10 | 37 | 64 |

EXAMPLE 2

Phytophthora test (systemic)

Solvent: 4.7 parts by weight acetone
Emulsifier: 0.3 part by weight alkylarylpolyglycol ether
Water: 95 parts by weight The amount of the active compound required for the desired concentration of the active compound in the liquid to be used for watering was mixed with the stated amount of solvent, and the concentrate was diluted with the stated amount of water which contained the stated additions.

Tomato plants grown in standard soil were, in the 2–3 leaf stage, watered three times in one week with 20 ml of the liquid to be used for watering, in the stated concentration of active compound with reference to 100 cc of soil.

The thus treated plants were, after treatment, inoculated with an aqueous spore suspension of *Phytophthora infestans* de By. The plants then went into a moist chamber with an atmospheric humidity of 100 percent and a temperature of 18–20°C. After 3–5 days the infection of the tomato plants was determined as a percentage of the untreated but likewise inoculated control plants. 0 percent means no infection; 100 percent means that the infection was exactly as great as in the case of the control plants.

The active compounds, the concentrations of the active compounds and the results can be seen from the following Table 2.

Table 2

Phytophthora test / systemic

| Active Compound | Infection as a percentage of the infection of the untreated control with a concentration of active compound (in % by weight) of |
|---|---|
| | 120 ppm |
| (known) (A) [Zn dithiocarbamate structure] | 100 |
| (1) [benzimidazole sulfonamide structure] | 2 |

EXAMPLE 3

Phytophthora test /curative

Solvent: 4.7 parts by weight acetone
Dispersing agent: 0.3 part by weight alkylarylpolyglycol ether
Water: 95 parts by weight The amount of active compound necessary for the desired concentration of active compound in the preparation mixture was mixed with the stated amount of solvent, and the concentrate was diluted with the stated amount of water which contained the said additions.

From tomato plants (Bonny best variety) pinnules were removed and these were laid with the top side facing upwards in Petri dishes the lid and bottom of which were provided with moist filter paper. The pinnules introduced were sprayed with an aqueous spore suspension of *Phytophthora infestans* and incubation was effected in closed dish for 6 hours at 20°. The leaves were subsequently immersed in the preparation mixture prepared according to the above process. The immersion time was 15 seconds.

After a further incubation of 3 days of 20°C in closed dish, the infection on the treated pinnules was determined as a percentage of the infection of the untreated but likewise inoculated pinnules (=control). 0 percent means no infection; 100 percent means that the infection was exactly as great as in the case of the control.

The active compounds, the concentrations of the active compounds and the results can be seen from the following Table 3.

Table 3

Phytophthora test / curative

| Active compound | Infection as a percentage of the infection of the untreated control with a concentration of active compound (in % by weight) of | |
|---|---|---|
| | 0.1% | 0.025% |
| (known) (A) [Zn dithiocarbamate structure] | 100 | 100 |
| (1) [benzimidazole sulfonamide structure] | 22 | 15 |

EXAMPLE 4

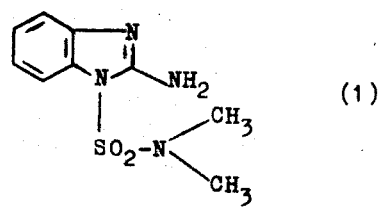
(1)

66.5 g (0.5 mole) 2-aminobenzimidazole were introduced into 200 ml chloroform. To this were added dropwise 71.75 g (0.5 mole) dimethylsulfamic acid chloride and, subsequently, 50.5 g (0.5 mole) triethylamine. The temperature during this time was kept to 25° to 30°C. Thereafter the mixture was kept at the boil for 1 hour and, after cooling, suction filtration was effected followed by washing well with water, and the product was dried at 75°C in a vacuum drying cupboard. 95 g (79 percent of theory) of 1-dimethylaminosulfonyl-2-aminobenzimidazole were obtained. The substance could be purified by recrystallization from alcohol; m.p. 207°–208°C. Toxicity, rat, per os: $LD_{50}> 2500$ mg/kg.

In similar manner there were obtained the following compounds:

1. A 1-aminosulfonyl-2-aminobenzimidazole of the formula

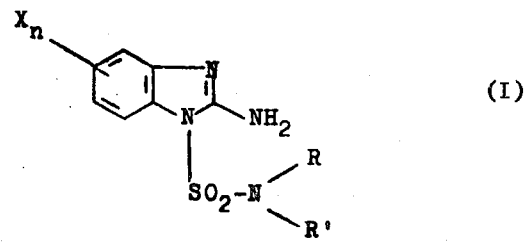

(I)

| Compound No. | Formula | m.p. |
|---|---|---|
| 2 | (2) | 203–5°C |
| 3 | (3) | 190–5°C |
| 4 | (4) | 176–9°C |
| 5 | (5) | 156–7°C |
| 6 | (6) | 201–3°C |

It will be appreciated that the instant specification and examples are set forth by way of illustration and not limitation, and that various modifications and changes may be made without departing from the spirit and scope of the present invention.

What is claimed is:

in which

X is halogen, lower alkyl or lower alkoxy, $n$ is 0, 1 or 2,

R and R' each independently is alkyl of 1 to 6 carbon atoms optionally substituted by one of halogen or lower alkoxy, or R and R', together with the connecting nitrogen atom, is pyrrolidino or piperidino.

2. A compound according to claim 1 in which X is chlorine, bromine, fluorine, methyl, ethyl, isopropyl, n-butyl, methoxy, ethoxy or isopropoxy; n is 0 or 1; and R and R' each independently is methyl, ethyl, n-propyl, methoxyethyl or chloroethyl, or R and R' together with the nitrogen atom is pyrrolidino or piperidino.

3. The compound according to claim 1 wherein such compound is 1-dimethylaminosulfonyl-2-aminobenzimidazole of the formula v,

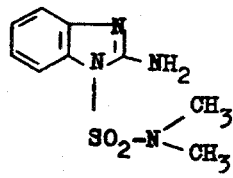
(1)

4. The compound according to claim 1 wherein such compound is 1-dimethylaminosulfonyl-2-amino-5-chlorobenzimidazole of the formula

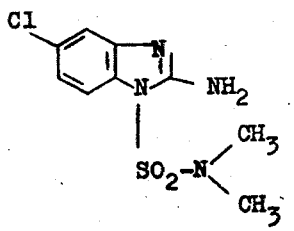
(2)

5. The compound according to claim 1 wherein such compound is 1-dimethylaminosulfonyl-2-amino-5-methyl-benzimidazole of the formula

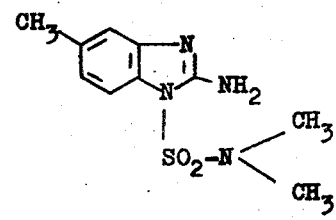
(3)

6. The compound according to claim 1 wherein such compound is 1-dimethylaminosulfonyl-2-amino-5-methoxybenzimidazole of the formula

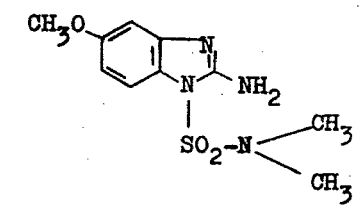
(4)

7. The compound according to claim 1 wherein such compound is 1-diethylaminosulfonyl-2-aminobenzimidazole of the formula

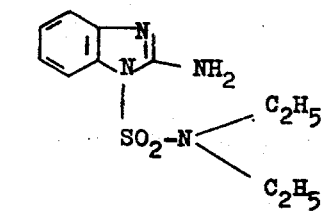
(5)

* * * * *